(No Model.)
W. E. RICHARDSON.
ORE CONVEYER.
No. 435,667. Patented Sept. 2, 1890.
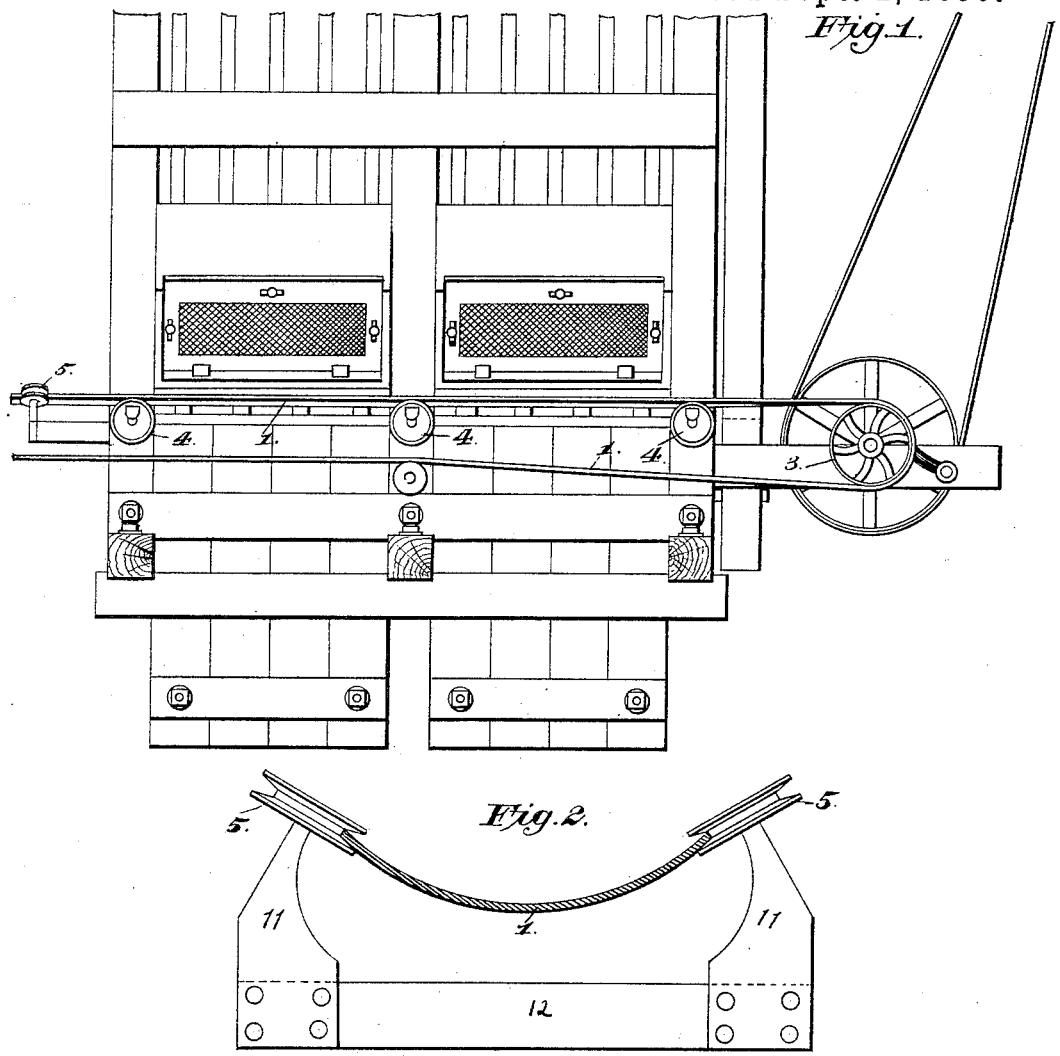

UNITED STATES PATENT OFFICE.

WILBER E. RICHARDSON, OF RUMSEY, MONTANA.

ORE-CONVEYER.

SPECIFICATION forming part of Letters Patent No. 435,667, dated September 2, 1890.

Application filed April 15, 1890. Serial No. 348,026. (No model.)

*To all whom it may concern:*

Be it known that I, WILBER E. RICHARDSON, a citizen of the United States, residing at Rumsey, in the county of Deer Lodge and State of Montana, have invented a new and useful Ore-Conveyer, of which the following is a specification.

The invention relates to improvements in ore-conveyers.

The object of the present invention is to provide a simple and inexpensive conveyer adapted to be readily placed beneath the point of discharge of and capable of readily carrying the crushed material operated upon to any desirable point without liability of spilling.

The invention consists in the construction and novel combination and arrangement of parts, hereinafter fully described in the accompanying drawings, and pointed out in the claims hereto appended.

In the drawings, Figure 1 is an elevation illustrating the conveyer applied to an ore crusher or battery. Fig. 2 is a detail sectional view illustrating the manner of supporting and guiding the belt. Fig. 3 is a similar view of one of the concaved pulleys.

Referring to the accompanying drawings, 1 designates an endless belt, which is preferably constructed of rubber, and is arranged beneath the discharge-openings of an ore-crusher hopper, and is adapted to receive the contents of the mill after being operated upon and convey the same to any desirable point. The endless belt is made to present a concave upper surface, and is adapted to prevent the material falling from it during its passage from the mill, and the said belt passes around pulley 3, that is connected with a drive-wheel and arranged at one end of the conveyer, and the said belt passes over a series of guide-pulleys 4. In order to support the belt and to maintain the concaved shape, sheaves 5 are provided, which are arranged at an inclination, and are provided with grooves to receive the side edges of the belt. The sheaves are mounted upon inwardly-inclined journal-arms 11, secured to a transverse beam 12. The pulleys are mounted upon suitable brackets 6, that are bolted to the sides of the battery-posts or other suitable supporting-surfaces and which are provided with integral spindles. The spindles 7 are provided with longitudinal oil-grooves 8, that extend about midway their length and communicate with the exterior of the spindle by transverse slots 9. The concave pulley is retained upon the spindle by a suitable set-screw 10, and the end of the spindle is provided with an oil-cup communicating with the oil-groove, whereby the spindle and the pulley are kept continually lubricated.

It will readily be seen that by arranging the concaved endless belt transversely across the mill it is adapted to readily receive the contents of the mill after being operated upon and is capable of carrying the same without liability of spilling to the desired point.

From the foregoing description and the accompanying drawings the construction, operation, and advantages of the invention will readily be seen, and I desire it to be understood that I do not limit myself to the precise details of construction herein shown and described, as I may, without departing from the spirit of the invention, make minor changes therein.

Having thus described my invention, I claim—

1. The combination of the endless belt presenting a concave outer surface and the sheaves 5, arranged at an angle and provided with annular grooves to receive the side edges of the belt, substantially as and for the purpose described.

2. The combination of the endless belt presenting a concave outer surface, the beam 12, arranged beneath the belt, the inwardly-inclined journal-arms projecting upward from the beam and arranged at each side of the belt, and the grooved sheaves mounted upon the journal-arms and supporting the belt at the edges thereof, substantially as described.

In testimony that I claim the foregoing as my own I have hereto affixed my signature in presence of two witnesses.

WILBER E. RICHARDSON.

Witnesses:
FRANK D. BRONEL,
GEORGE A. STORRAR.